United States Patent
Dohner et al.

(10) Patent No.: US 11,479,676 B2
(45) Date of Patent: Oct. 25, 2022

(54) AQUEOUS PRETREATMENT FOR BONDED JOINTS WITH INCREASED HEAT STABILITY

(71) Applicant: SIKA TECHNOLOGY AG, Baar (CH)

(72) Inventors: Reto Dohner, Zurich (CH); Sara Fornera, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 275 days.

(21) Appl. No.: 16/495,780

(22) PCT Filed: May 9, 2018

(86) PCT No.: PCT/EP2018/061967
§ 371 (c)(1),
(2) Date: Sep. 19, 2019

(87) PCT Pub. No.: WO2018/206623
PCT Pub. Date: Nov. 15, 2018

(65) Prior Publication Data
US 2020/0024405 A1      Jan. 23, 2020

(30) Foreign Application Priority Data
May 9, 2017    (EP) .................................... 17170160

(51) Int. Cl.
| C09D 5/00 | (2006.01) |
| C09D 7/63 | (2018.01) |
| C03C 17/30 | (2006.01) |
| C08G 77/14 | (2006.01) |
| C08G 77/28 | (2006.01) |
| C08G 77/58 | (2006.01) |
| C08K 5/09 | (2006.01) |
| C08K 5/17 | (2006.01) |
| C08K 5/3415 | (2006.01) |
| C09D 183/08 | (2006.01) |

(52) U.S. Cl.
CPC .............. *C09D 5/002* (2013.01); *C03C 17/30* (2013.01); *C08G 77/14* (2013.01); *C08G 77/28* (2013.01); *C08G 77/58* (2013.01); *C08K 5/09* (2013.01); *C08K 5/17* (2013.01); *C08K 5/3415* (2013.01); *C09D 7/63* (2018.01); *C09D 183/08* (2013.01); *C03C 2217/29* (2013.01); *C08G 2190/00* (2013.01)

(58) Field of Classification Search
None
See application file for complete search history.

(56) References Cited

U.S. PATENT DOCUMENTS

| 6,649,273 B2 * | 11/2003 | Iwato .................... C03C 17/009 428/448 |
| 2002/0123592 A1 | 9/2002 | Zhang et al. |
| 2010/0323203 A1 | 12/2010 | Huck |

FOREIGN PATENT DOCUMENTS

| DE | 34 07 087 A1 | 9/1985 |
| EP | 1 894 966 A1 | 3/2008 |
| EP | 2 128 103 A1 | 12/2009 |
| EP | 2 762 535 A1 | 8/2014 |
| EP | 2 951 244 B1 | 12/2016 |
| WO | 00/29496 A1 | 5/2000 |
| WO | 2006/010388 A1 | 2/2006 |
| WO | 2008/041976 A2 | 4/2008 |
| WO | 2008/061556 A2 | 5/2008 |
| WO | WO 2017/184416 | * 10/2017 |
| WO | WO 2019/023212 | * 1/2019 |

OTHER PUBLICATIONS

Jul. 31. 2018 Search Report issued in International Patent Application No. PCT/EP2018/061967.

* cited by examiner

*Primary Examiner* — Marc S Zimmer
(74) *Attorney, Agent, or Firm* — Oliff PLC

(57) ABSTRACT

An aqueous composition including: a) at least one epoxy silane containing at least one epoxy group and at least one hydrolysable group bound to Si, b) at least one non-ionic wetting agent and either c1) between 0.2 and 2 wt. % of at least one mercapto silane containing at least one mercapto group and at least one hydrolysable group bound to Si, and as many water-soluble acids as required for the pH of resulting composition to be between 1 and 6, on the condition that epoxy silane content amounts to between 0.2 and 1 wt. %, or c2) between 0.1 and 1 wt. % of a water-soluble organotitanate, in relation to entire weight of aqueous composition, and as many water-soluble bases as required for the pH of resulting composition to be between 8 and 14, on the condition that the epoxy silane content amounts to between 0.2 and 0.5 wt. %.

14 Claims, No Drawings

AQUEOUS PRETREATMENT FOR BONDED JOINTS WITH INCREASED HEAT STABILITY

TECHNICAL FIELD

The invention relates to a composition, especially an aqueous one- or two-component composition, which is suitable as adhesion promoter composition, to a process for producing the composition and to the use thereof.

PRIOR ART

Adhesive bonding is a widely used joining methodology. However, some substrates (bonding substrates) can be problematic here since they are able to build up zero or unsatisfactory adhesion with certain adhesives, or there is loss of bonding with time, particularly under demanding environmental conditions. Adhesion promoter compositions that are applied to the substrate before the adhesive in order to form an interlayer between the substrate and the adhesive have long been used for that reason, in order to improve adhesion. A particularly important field of use of adhesion promoter compositions is vehicle construction, especially in direct glazing, the bonding of panes to vehicle bodywork.

Typically, such compositions are based on organosilanes, which enable an ideal interlayer for bonds of glasses and other materials. More particularly, such adhesion promoter compositions are used as primers and activators, i.e. as adhesion-promoting undercoat. Such compositions frequently contain inert, readily volatile solvents in order to assure rapid flashoff. However, the content of organic solvent is disadvantageous in terms of environmental compatibility and occupational safety.

Aqueous adhesion promoter compositions based on organosilanes and containing water as solvent are known. However, they have some disadvantages. A problem with silane-based aqueous adhesion promoter compositions is that they have either relatively low storage stability coupled with adequate reactivity or inadequate reactivity coupled with adequate stability. This is because the silanes used have hydrolyzable functional groups that are hydrolyzed on mixing with water to form silanol groups (Si—OH). Such silanol groups are frequently reactive and condense spontaneously with one another and formation of condensation products of relatively high molecular weight, which leads to insoluble precipitates in the adhesion promoter compositions and impairment of function.

In addition, the use of aminosilanes and/or mercaptosilanes in such aqueous adhesion promoter compositions is known. The emulsifying of mercaptosilanes or oligosilane-mercaptosilane mixtures in water is particularly difficult since the mercaptosilanes are not water-soluble before the silane groups are hydrolyzed. In order to bring these silanes into water, prior to the hydrolysis, complete homogeneous distribution has to be assured. In addition, the pH has to be adjusted with acids, for example acetic acid, such that the condensation that occurs as a further reaction is slowed as far as possible. Therefore, the silanes and the water have to be rapidly mixed homogeneously, which requires special mixing apparatuses.

The effect of this is that aqueous adhesion promoter compositions are generally sold as 2-component systems (e.g. Sika HydroPrep®-100 from Sika Schweiz AG) and a mixing process for the mixing of the two components is required on site prior to use. It is important that the two components are very rapidly mixed homogeneously with very significant turbulence. A specially developed piece of equipment ("shaker") is required for the purpose. After the formulation, the ready-mixed product has a storage stability ("pot life") of not more than 30 days.

However, this problem was remedied by special formulations as taught in EP2951244. The aqueous adhesion promoter compositions disclosed therein have very good storage stability even as one-component formulations.

In spite of these further developments, however, aqueous adhesion promoter compositions based on oligosilanes still have some disadvantages that restrict their use for demanding bonds. More particularly, adhesive bonds based on such adhesion promoters usually have poorer heat stability compared to adhesion promoters based on organic solvents. In combination with specific adhesives, this can lead to problems when the bond is subjected to hot conditions over a prolonged period since it can lose stability after a while under such circumstances with some substrates, especially glass.

SUMMARY OF THE INVENTION

It is therefore an object of the present invention to provide aqueous, silane-based adhesion promoter compositions that have excellent storage stability, such that the aqueous compositions can also be sold as one-component aqueous adhesion promoter systems, and simpler mixing shall also be possible without special mixing equipment, and these additionally bring about a distinct improvement in heat stability of the bond.

It has now been found that, surprisingly, it is possible either through the addition of at least one mercaptosilane to an aqueous composition comprising an epoxysilane and adjustment of the pH of the resulting mixture to the acidic range or through the addition of at least one organotitanate and adjustment of the pH of the resulting mixture to the basic range to produce a storage-stable, one-component composition that enables bonds having high heat stability. Both alternative measures lead unexpectedly to the same technical result and hence the aqueous composition can be used in a multitude of applications, even in the presence of acid- or base-sensitive substrates and/or adhesives.

Accordingly, the invention relates to an aqueous composition comprising a) at least one epoxysilane having at least one epoxy group and at least one Si-bonded hydrolyzable group, b) at least one nonionic wetting agent, and either c1) 0.2% to 2% by weight, based on the total weight of the aqueous composition, of at least one mercaptosilane having at least one mercapto group and at least one Si-bonded hydrolyzable group, and a sufficient amount of a water-soluble acid that the pH of the resulting composition is between 1 and 6, with the proviso that the epoxysilane is present in an amount of 0.2% to 1% by weight, based on the total weight of the aqueous composition;

or c2) 0.1% to 1% by weight of a water-soluble organotitanate, based on the total weight of aqueous composition, and a sufficient amount of a water-soluble base that the pH of the resulting composition is between 8 and 14, with the proviso that the epoxysilane is present in an amount of 0.2% to 0.5% by weight, based on the total weight of the aqueous composition.

It has been found that, surprisingly, it is possible with the compositions of the invention and using an adhesive to produce extremely heat-stable bonds. The bonds formed can be stored for several weeks, for example 5 weeks, at 90° C. without loss of bonding. An additional, astonishing finding has been improved miscibility of the reactive components in water, which distinctly simplifies the mixing process and enables problem-free production in a standard reactor. The invention thus enables easier handling since the product can be supplied as a 1-component system and no longer as a complicated 2-component system. The invention thus satisfies the demand for supply of an aqueous 1-component system.

The aqueous composition of the invention is quite generally suitable as a reactive, invisible bonding pretreatment for substrates, especially glass and glass ceramics, or for direct glazing in automobile construction as a pretreatment for the bond, especially with polyurethane adhesives, preferably one-component polyurethane adhesives.

Way of Executing the Invention

In the present document, the terms "silane" and "organosilane" refer to compounds that firstly have at least one hydrolyzable group, typically two or three hydrolyzable groups, preferably alkoxy groups or acyloxy groups bonded directly to the silicon atom via Si—O bonds, and secondly have at least one organic radical bonded directly to the silicon atom via a Si—C bond. Such silanes having alkoxy or acyloxy groups are also known to the person skilled in the art as organoalkoxysilanes or organoacyloxysilanes.

The silanes have the property of undergoing hydrolysis on contact with moisture. This forms organosilanols, i.e. organosilicon compounds containing one or more silanol groups (Si—OH groups) and, through subsequent condensation reactions, organosiloxanes, i.e. organosilicon compounds containing one or more siloxane groups (Si—O—Si groups).

"Epoxysilanes", "aminosilanes" and "mercaptosilanes" refer to organosilanes wherein the organic radical respectively has an epoxy group, an amino group and a mercapto group. Organosilicon compounds having amino, mercapto or oxirane groups are also referred to as "aminosilanes", "mercaptosilanes" or "epoxysilanes".

"Primary aminosilanes" refer to aminosilanes having a primary amino group, i.e. an $NH_2$ group bonded to an organic radical. "Secondary aminosilanes" refer to aminosilanes having a secondary amino group, i.e. an NH group bonded to two organic radicals.

An Si-bonded hydrolyzable group is a group that can be hydrolyzed by hydrolysis to a silanol group, optionally in the presence of a catalyst. Hydrolysis products are silanes wherein the hydrolyzable groups have been at least partly hydrolyzed, i.e. at least some of the hydrolyzable groups have been replaced by an OH group. Condensation products include condensates of two or more hydrolyzed silanes of this kind. These hydrolysis and condensation products of silanes are known to the person skilled in the art.

The expression "independently" here always also means independently within the same molecule if there are different options.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

"Room temperature" refers to a temperature of 23±2° C., especially 23° C. All industry standards and official standards mentioned in this document, unless stated otherwise, relate to the version valid at the time of filing of the first application.

The composition of the invention contains one or more organosilanes, among them at least one epoxysilane. Organosilanes in the composition of the invention each have at least one Si-bonded hydrolyzable group. These may be any customary hydrolyzable groups, preference being given to alkoxy groups and acyloxy groups, and particular preference to $C_1$-$C_4$-alkoxy groups. After mixing with water, the hydrolyzable groups can be hydrolyzed with time. The result in that case is hydrolysis products in which at least some of the hydrolyzable groups are replaced by OH groups. As a further reaction, condensation products may form via the silanol groups formed in the hydrolysis products. For instance, the organosilanes present may also be in fully hydrolyzed or partly hydrolyzed or even partlycondensed form.

The epoxysilane present in the composition of the invention has at least one epoxy group and at least one Si-bonded hydrolyzable group. The epoxy group is preferably a glycidoxy or epoxycyclohexyl group, especially a glycidoxy group.

Preferred epoxysilanes are (epoxyalkoxy)alkyltrialkoxysilanes and 3-glycidoxypropyltrialkoxysilanes. Particular preference is given to gamma-glycidoxypropyltrimethoxysilane. Preferred representatives of these substance classes are beta-(3,4-epoxycyclohexyl)ethyltrimethoxysilane and beta-(3,4-epoxycyclohexyl)ethyltriethoxysilane, and also 3-glycidoxypropyltrimethoxysilane and/or 3-glycidoxypropyltriethoxysilane. More preferably, 3-glycidoxypropyltrimethoxysilane and/or 3-glycidoxypropyltriethoxysilane are present in the composition of the invention.

For the composition, it is possible for one or more epoxysilanes to be present.

The composition of the invention also comprises at least one nonionic wetting agent. A "nonionic wetting agent" is understood to mean all substances that are not predominantly in ionic form in water and are capable of lowering the surface tension of water and/or enable the stabilization of emulsions. These include nonionic surfactants, surface-active substances, emulsifiers and similar substances that have these properties.

The suitable nonionic surfactants include, for example, ethoxylates, for example ethoxylated addition products of alcohols, for example polyethers, glycol ethers, polyoxyalkylenepolyols, amines, fatty acids, fatty acid amides, alkylphenols, ethanolamides, fatty amines, polysiloxanes, polyethersiloxanes or fatty acid esters, but also alkyl or alkylphenyl polyglycol ethers, for example fatty alcohol polyglycol ethers, or fatty acid amides, alkyl glycosides, sugar esters, sorbitan esters, polysorbates or trialkylamine oxides, but also esters and amides of poly(meth)acrylic acids with polyalkylene glycols or amino polyalkylene glycols, which may be terminated by alkyl groups at one end at most.

Such surfactants are widely commercially available. Particularly suitable are alkoxylated alcohols, alkoxylated nonionic fluorosurfactants, especially Zonyl® FSO-100, which is commercially available from ABCR, Germany, alkoxylated alcohols or alkoxylated alkyl phenols, especially Antarox FM 33, which is commercially available commercially from Rhodia. In addition, preference is given to alkoxylated fatty alcohols, such as Hydropalat® 120 from Cognis. Particular preference is given to using Hydropalat® 3037 from Cognis as nonionic wetting agent. Also very preferred are polyethers, especially short-chain polyethers having molar masses up to 300 g/mol, especially up to 205 g/mol, preferably up to 200 g/mol, for example glycol ethers. Preferred polyethers are polypropylene glycols, polyethylene glycols and triethylglycol dimethyl ether ("triglyme"), bis(2-methoxyethyl) ether ("diglyme") and, most preferably, 2,5,7,10-tetraoxaundecane.

The suitable emulsifiers especially also include those selected from pyrrolidones, propionamides and amino alcohol reaction products. Pyrrolidones are cyclic carboxamides; propionamides are linear carboxamides. Amino alcohols are used as an integrated emulsifier in the form of a reaction product having at least a portion of the aminosilane and/or mercaptosilane in the composition. Preference is given to the use of pyrrolidones or amino alcohol reaction products. The emulsifiers bring about better miscibility with water and slowed condensation reactions after addition of water.

The usable pyrrolidones are especially 2-pyrrolidones. 2-Pyrrolidones are cyclic carboxamides. The usable pyrrolidones may be 2-pyrrolidone, also referred to as γ-butyrolactam, or a derivative of 2-pyrrolidone having a substituent on at least one of the three methylene ring groups and/or on the nitrogen atom. Suitable substituents on the nitrogen atom are alkyl, e.g. $C_{1-12}$-alkyl, preferably $C_1$-$C_7$-alkyl, more preferably $C_1$-$C_4$-alkyl, especially methyl or ethyl, or cycloalkyl, preferably cyclopentyl and cyclohexyl, especially cyclohexyl. Suitable substituents on the methylene group are, for example, alkyl, preferably $C_1$-$C_4$-alkyl, especially methyl or ethyl.

Preference is given to N-substituted 2-pyrrolidones. They may optionally have a substituent on at least one methylene ring group, but this is not preferred. Examples are N—$C_1$-$C_{12}$-alkyl-2-pyrrolidone and polyvinylpyrrolidone. Examples of compounds having longer-chain alkyl groups are 1-octyl-2-pyrrolidone and 1-dodecylpyrrolidone. Particular preference is given to N—$C_1$-$C_7$-alkyl-2-pyrrolidone or N—$C_1$-$C_6$-alkyl-2-pyrrolidone, especially N—$C_1$-$C_4$-alkyl-2-pyrrolidone, and N-cycloalkyl-2-pyrrolidone, such as N-cyclohexyl-2-pyrrolidone. Most preferred are N-methyl-2-pyrrolidone (NMP), N-ethyl-2-pyrrolidone (NEP) and especially N-cyclohexyl-2-pyrrolidone (CHP).

Suitable propionamides are propionamide itself and derivatives of propionamide. Examples of suitable propionamides are propionamides of the formula

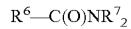

$R^6$—C(O)N$R^7_2$ in which $R^6$ is a substituted or unsubstituted ethyl group and $R^7$ is independently H or a $C_{1-4}$-alkyl group, especially methyl or ethyl. Preferably, at least one $R^7$ group is a $C_{1-4}$-alkyl group and, more preferably, both $R^7$ groups are a $C_{1-4}$-alkyl group, preference being given to the methyl and ethyl group.

The $R^6$ group may preferably have at least one substituent and preferably exactly one substituent on the ethyl group. The substituent is preferably at the terminal end of the ethyl group, i.e. on the C3 atom of the propionamide. Examples of suitable substituents are $C_1$-$C_4$-alkoxy groups, such as methoxy, ethoxy, propoxy and butoxy.

Specific examples are 3-methoxy-N,N-dimethylpropionamide and 3-butoxy-N,N-dimethylpropionamide.

The amino alcohol with which the amino alcohol reaction product is formed is a compound having at least one amino group and at least one hydroxyl group. The amino alcohol may have one or two hydroxyl groups, for example, preference being given to one hydroxyl group. The amino alcohol may have one or two or more amino groups, for example, where the amino groups may, for example, be primary or secondary amino groups.

Examples of amino alcohols suitable as emulsifier precursor for preparation of the amino alcohol reaction product are ethanolamine, diethyleneglycolamine, N-(β-aminoethyl)aminoethanol, diethanolamine and N-methyldiethanolamine, most preferably diethyleneglycolamine. Diethyleneglycolamine is also referred to as 2-(2-aminoethoxy)ethanol.

When at least one amino alcohol reaction product is used as emulsifier, the amino alcohol and at least some of the epoxysilane and any further organosilanes present are present in the form of a reaction product in which at least some of the hydrolyzable groups which in the at least one epoxysilane and any further organosilanes present have been replaced by the aminoalkoxide group of the amino alcohol.

The reaction product is obtained by a transesterification or esterification of at least some of the Si-bonded hydrolyzable groups in the silanes present in the composition with the amino alcohol.

The degree of transesterification or esterification can be chosen within a wide range. It is also possible for all the Si-bonded hydrolyzable groups in the epoxysilanes present in the composition and any further organosilanes present to be replaced by the aminoalkoxide group. Preferably, the degree of transesterification or esterification is chosen such that, based on the total amount of the silanes present in the composition, the molar ratio of the Si-bonded hydrolyzable groups and the Si-bonded aminoalkoxide groups present in the silanes to the Si-bonded aminoalkoxide groups is in the range from 1:1 to 10:1, preferably from 10:5 to 10:2.

When, for example, in a silane having three hydrolyzable groups (e.g. methoxy), a hydrolyzable group is replaced by an aminoalkoxide group, the reaction product contains two hydrolyzable groups and one aminoalkoxide group. The molar ratio of the Si-bonded hydrolyzable groups (2) and the Si-bonded amino groups (1) to the Si-bonded aminoalkoxide groups (3) would in that case be 3:1. Although the aminoalkoxide group is in principle also a hydrolyzable group, this is not taken into account here.

It will be apparent that this molar ratio is based on the composition before there have been any hydrolysis and/or condensation reactions. It will also be apparent that a composition containing the reaction product described may be a mixture of different compounds, for example unconverted epoxysilanes and any further organosilanes present that have one, two or three aminoalkoxide groups. The aforementioned molar ratios should therefore be regarded as averages. After addition of water, it is additionally possible for hydrolysis and/or condensation products to form.

Epoxysilanes and any further silanes present that have aminoalkoxide groups as a result of the transesterification or esterification are still regarded here as epoxysilanes or any further organic silanes present. The process for preparing the mixtures or the reaction products is elucidated in detail further down.

In a preferred embodiment, a further emulsifier selected from pyrrolidones and propionamides, preferably pyrrolidones, especially N-cyclohexyl-2-pyrrolidone, is additionally added to the composition containing the amino alcohol reaction product. In this way, it is possible to further increase miscibility of the composition and storage stability of the aqueous composition obtained.

In preferred embodiments, the at least one nonionic wetting agent present is selected from emulsifiers or surfactants from the group of polyethers, polyethersiloxanes, pyrrolidones and modified natural oils.

In a first preferred main embodiment, the composition of the invention additionally contains 0.2% to 2% by weight, preferably 0.25% to 1% by weight, based on the total weight of the aqueous composition, of at least one mercaptosilane having at least one mercapto group and at least one Si-bonded hydrolyzable group, and a sufficient amount of a water-soluble acid that the pH of the resulting composition is between 1 and 6, preferably between 2.5 and 5, with the proviso that the epoxysilane is present in an amount of 0.2% to 1% by weight, preferably 0.3% to 0.8% by weight, based on the total weight of the aqueous composition.

This embodiment leads to particularly heat-stable bonds that show excellent bonding properties even below room temperature, and is especially suitable for base-sensitive, or acid-stable, substrates and/or adhesives.

In this embodiment, preference is given to using a polyether as nonionic wetting agent, more preferably 2,5,7,10-tetraoxaundecane. Further particularly preferred nonionic wetting agents in this embodiment are pyrrolidones, especially N-cyclohexyl-2-pyrrolidone, and/or polyether-modified siloxane, especially BYK-349 from BYK Chemie GmbH, Germany, and/or modified natural oil, especially Hydropalat® 3037 from Cognis, Germany. The preferred amounts of these nonionic wetting agents in this embodiment are 0.1-2.0% by weight, based on the overall composition, for pyrrolidones and/or polyethers, 0.1-0.5% by weight, based on the overall composition, for polyether-modified siloxane, and 0.25-0.75% by weight, based on the overall composition, for modified natural oil.

The mercaptosilane present in this embodiment that has at least one Si-bonded hydrolyzable group is preferably a mercapto-functional organoalkoxysilane, i.e. mercaptosilane that bears a C1 to C4 alkoxy group on the hydrolyzable silane group. Particular preference is given to mercapto-functional organomethoxysilanes and mercapto-functional organoethoxysilanes. Mercaptosilanes having three alkoxy groups, especially three methoxy groups, have been found to be particularly advantageous. Particularly preferred mercaptosilanes are 3-mercaptopropyltrimethoxysilane and 3-mercaptopropyltriethoxysilane and 3-mercaptopropylmethyldimethoxysilane, especially 3-mercaptopropyltrimethoxysilane and 3-mercaptopropyltriethoxysilane, more preferably 3-mercaptopropyltrimethoxysilane.

However, it is also possible to use mercaptosilanes having multiple mercapto and/or multiple silane groups.

In this embodiment, the at least one mercaptosilane is present in the composition of the invention in an amount of 0.2% to 2% by weight, preferably 0.25% to 1% by weight, especially preferably in an amount of 0.3-0.75% by weight, based on the overall composition.

In addition, this embodiment of the invention contains at least one water-soluble acid. In this embodiment, this acid is present in such an amount that the pH of the resulting composition is between 3 and 6, preferably between 2.5 and 5. Without using an acid, it is not possible in this embodiment of the invention to obtain a stable composition having acceptable storage stability without showing turbidity and precipitates. The acid may be organic or inorganic. Organic acids are firstly carboxylic acids, especially a carboxylic acid selected from the group comprising formic acid, acetic acid, propionic acid, trifluoroacetic acid, oxalic acid, malonic acid, succinic acid, maleic acid, fumaric acid and citric acid, and amino acids, especially aspartic acid and glutamic acid. A preferred carboxylic acid is acetic acid.

Organic acids are secondly especially those containing a sulfur atom or a phosphorus atom. Such organic acids are especially organic sulfonic acids. Organic sulfonic acid is understood to mean compounds that have an organic radical having carbon atoms and have at least one functional group —$SO_3H$. Preference is given to aromatic sulfonic acids.

The aromatic sulfonic acid may be mono- or polycyclic, and one or more sulfo groups may be present. For example, this may be naphthalene-1- or -2-sulfonic acid, naphthalene-1,5-disulfonic acid, benzenesulfonic acid or alkylbenzenesulfonic acids.

The acid may also be an inorganic acid. Suitable inorganic acids are, for example, those that have a sulfur atom or a phosphorus atom. Acids having phosphorus atoms are especially phosphoric acid, phosphorous acid, phosphonic acid, phosphonous acid. Acids having sulfur atoms are especially sulfur acids, especially sulfuric acid, sulfurous acids, persulfuric acid, disulfuric acid (=pyrosulfuric acid), disulfurous acid, dithionic acid, dithionous acid, thiosulfuric acid or thiosulfurous acid.

Preference is given to acids having a $pK_a$ between 4.0 and 5. $pK_a$ is understood by the chemist in a known manner to mean the negative decadic logarithm of the acid dissociation constant $K_a$: $pK_a = -\log_{10} K_a$.

Typical amounts of the acid for the adjustment of the pH to the desired range depend of course on the acid used and its strength. For carboxylic acids, especially acetic acid, a suitable amount is typically between 0.15% and 2.5% by weight, based on the overall composition.

In a second preferred main embodiment, the composition of the invention additionally contains 0.1% to 1% by weight, preferably 0.3% to 0.6% by weight of a water-soluble organotitanate, based on the total weight of the aqueous composition, and a sufficient amount of a water-soluble base that the pH of the resulting composition is between 8 and 14, preferably between 9 and 11.5, with the proviso that the epoxysilane is present in an amount of 0.2% to 0.5% by weight, preferably 0.2% to 0.4% by weight, based on the total weight of the aqueous composition.

This embodiment leads to particularly heat-stable bonds that show excellent bonding properties even below room temperature, and is especially suitable for acid-sensitive, or base-stable, substrates and/or adhesives.

In this embodiment, preference is given to using a polyether as nonionic wetting agent, more preferably 2,5,7,10-tetraoxaundecane. Further particularly preferred nonionic wetting agents in this embodiment are pyrrolidones, especially N-cyclohexyl-2-pyrrolidone. The preferred amounts of these nonionic wetting agents in this embodiment are 1.0-3.0% by weight, based on the overall composition, for pyrrolidones and/or polyethers.

This embodiment contains, as a first additional constituent, 0.3% to 0.6% by weight of a water-soluble organotitanate, based on the total weight of the aqueous composition. Suitable water-soluble organotitanates are preferably those of the formula $Ti(OR)_4$, i.e. comprising substituents bonded via an oxygen-titanium bond, also including chelate substituents (polydentate ligands). Particularly suitable substituents bonded to the titanium atom via an oxygen-titanium bond are those substituents selected from the group comprising alkoxy group, sulfonate group, carboxylate group, dialkylphosphate group, dialkylpyrophosphate group and acetylacetonate group. Particularly suitable compounds are those in which all substituents bonded to the titanium are selected from the group comprising alkoxy group, sulfonate group, carboxylate group, dialkylphosphate group, dialkylpyrophosphate group and acetylacetonate group, where all substituents may be identical or different. Particularly suitable alkoxy groups have been found to be especially methoxy, ethoxy, propoxy, isopropoxy, butoxy and isobutoxy substituents.

Suitable organotitanium compounds are commercially available, for example from Kenrich Petrochemicals or DuPont. Examples of suitable organotitanium compounds are, for example, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 44, KR 55, LICA 01, LICA 09, LICA 12, LICA 38, LICA 44, LICA 97, LICA 99, KR OPPR, KR OPP2 from Kenrich Petrochemicals or Tyzor® ET, TPT, NPT, BTM, AA, AA-75, AA-95, AA-105, TE, ETAM, OGT from DuPont.

Preference is given to Ken-React® KR 7, KR 9S, KR 12, KR 26S, KR 38S, KR44, LICA 09, LICA 44, NZ 44, and Tyzor® ET, TPT, NPT, BTM, AA, AA-75, AA-95, AA-105, TE, ETAM from DuPont.

Particular preference is given to organotitanium compounds having substituents of the formulae (II) and/or (III) bonded to the titanium atom via an oxygen-titanium bond.

A most preferred organotitanate is 2-propanolatotris(3,6-diaza)hexanolatotitanium(IV), available under the Ken-React® KR44 trade name.

In addition, this embodiment of the invention contains at least one water-soluble base. In this embodiment, this base is present in such an amount that the pH of the resulting composition is between 8 and 14, preferably 9 and 11.5. The base may be organic or inorganic. Organic bases are firstly amines, especially tertiary amines, and amidines and guanidines, which may also have a mono- or polycyclic structure.

Suitable amines are especially alkyl-, cycloalkyl- or aralkylamines such as triethylamine, triisopropylamine and further water-soluble amines of this kind. Suitable biguanides are especially biguanide, 1-butylbiguanide, 1,1-dimethylbiguanide, 1-butylbiguanide, 1-phenylbiguanide or 1-(o-tolyl)biguanide (OTBG).

Suitable amidines are especially 1,8-diazabicyclo[5.4.0] undec-7-ene (DBU), 1,5-diazabicyclo[4.3.0]non-5-ene (DBN), 6-dibutylamino-1,8-diazabicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole or N-(3-triethoxysilylpropyl)-4,5-dihydroimidazole.

Suitable guanidines are especially 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl) propyl)-1,1,3,3-tetramethylguanidine, 2-(3-(triethoxysilyl) propyl)-1,1,3,3-tetramethylguanidine, 1,5,7-triazabicyclo-[4.4.0]dec-5-ene (TBD), 7-methyl-1,5,7-triazabicyclo [4.4.0]dec-5-ene, 7-cyclohexyl-1,5,7-triazabicyclo[4.4.0] dec-5-ene, 1-phenylguanidine, 1-(o-tolyl)guanidine (OTG), 1,3-diphenylguanidine, 1,3-di(o-tolyl)guanidine or 2-guanidinobenzimidazole.

Suitable inorganic bases are especially hydroxides such as sodium hydroxide or potassium hydroxide.

The base is preferably a compound having at least one tertiary amine group, especially an N-alkylated guanidine compound. Particular preference is given to tetramethylguanidine.

Typical amounts of the base for the adjustment of the pH to the desired range depend of course on the base used and its strength. For N-alkylated guanidine compounds, especially tetramethylguanidine, a suitable amount is typically between 0.25% and 0.55% by weight, based on the overall composition.

All embodiments of the composition of the invention optionally, but preferably, contain further organosilanes. More particularly, the composition of the invention comprises further organosilanes or oligomers of these organosilanes that have at least one Si-bonded hydrolyzable group and have at least one further functional group selected from primary amino groups, secondary amino groups, hydroxyl groups and isocyanurate groups.

Particularly suitable further organosilanes are organosilicon compounds of the formulae (I) or (II) or (III)

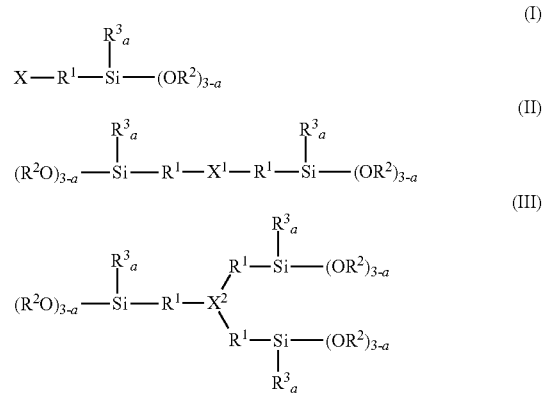

$R^1$ here is a linear or branched, optionally cyclic alkylene group having 1 to 20 carbon atoms, optionally having aromatic moieties, and optionally having one or more heteroatoms, especially nitrogen atoms.

$R^2$ here is H or an alkyl group having 1 to 5 carbon atoms, especially methyl or ethyl, or an acyl group, especially acetyl.

$R^3$ here is an alkyl group having 1 to 8 carbon atoms, especially methyl.

X here is H, or is a functional group selected from the group comprising OH, (meth)acryloyloxy, amine, acylthio and vinyl, preferably amine. For the sake of completeness, it is mentioned that acylthio in this document is understood to mean the substituent

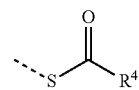

where $R^4$ is alkyl, especially having 1 to 20 carbon atoms, and the dotted line represents the bond to the substituent $R^1$.

$X^1$ here is a functional group selected from the group comprising NH, S, $S_2$ and $S_4$.

$X^2$ here is a functional group selected from the group comprising N and isocyanurate.

a here represents one of the values 0, 1 and 2, preferably 0.

The substituent R¹ is especially a methylene, propylene, methylpropylene, butylene or dimethylbutylene group. As particularly preferred is propylene group as substituent R¹.

Examples of suitable organosilicon compounds of the formula (I) are the organosilicon compounds selected from the group comprising octyltrimethoxysilane, dodecyltrimethoxysilane, hexadecyltrimethoxysilane, methyloctyldimethoxysilane; 3-methacryloyloxypropyltrialkoxysilanes, 3-methacryloyloxypropyltriethoxysilane, 3-methacryloyloxypropyltrimethoxysilane; 3-aminopropyltrimethoxysilane, 3-aminopropyltriethoxysilane, 3-aminopropyldimethoxymethylsilane, 3-amino-2-methylpropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropyldimethoxymethylsilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, [3-(2-aminoethylamino)propyl]trimethoxysilane (=4,7,10-triazadecyltrimethoxysilane), 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane; 3-acylthiopropyltrimethoxysilane; vinyltrimethoxysilane and vinyltriethoxysilane.

Also preferred are the organosilicon compounds just mentioned wherein the alkoxy groups are replaced by acetoxy groups, for example octyltriacetoxysilane (octyl-Si(O(O=C)CH₃)₃). Such organosilicon compounds eliminate acetic acid on hydrolysis.

Among these organosilicon compounds mentioned, preference is given to those that have an organic substituent bonded to the silicon atom which additionally have a functional group, i.e. which is not an alkyl group, and conform to a formula (I) in which X is not H.

Suitable examples of organosilicon compounds of the formula (II) are the organosilicon compounds selected from the group comprising bis[3-(trimethoxysilyl)propyl]amine, bis[3-(triethoxysilyl)propyl]amine, 4,4,15,15-tetraethoxy-3,16-dioxa-8,9,10,11-tetrathia-4-15-disilaoctadecane (bis(triethoxysilylpropyl) polysulfide or bis(triethoxysilylpropyl) tetrasulfane), bis(triethoxysilylpropyl) disulfide.

Suitable examples of organosilicon compounds of the formula (III) are the organosilicon compounds selected from the group comprising tris[3-(trimethoxysilyl)propyl]amine, tris[3-(triethoxysilyl)propyl]amine, 1,3,5-tris[3-(trimethoxysilyl)propyl]-1,3,5-triazine-2,4,6(1H,3H,5H)-trioneurea (=tris(3-(trimethoxysilyl)propyl) isocyanurate) and 1,3,5-tris[3-(triethoxysilyl)propyl]-1,3,5-triazine-2,4,6(1H,3H,5H)-trioneurea (=tris(3-(triethoxysilyl)propyl) isocyanurate).

Optionally, the composition may also comprise at least one tetraalkoxysilane of the formula (IV)

$$Si(OR^4)_4 \quad (IV)$$

where R⁴ is independently an alkyl group having 1 to 4 carbon atoms or an acyl group, especially acetyl group. Such tetraalkoxysilanes are, for example, tetramethoxysilane, tetraethoxysilane, tetraisopropoxysilane, tetrapropoxysilane, tetrabutoxysilane and tetraacetoxysilane. Particular preference is given to tetraethoxysilane. As in the case of the aminosilanes and mercaptosilanes, tetraalkoxysilanes can undergo hydrolysis in the presence of water and optionally condense with other silanes.

Preferred further organosilanes are aminosilanes, especially aminosilanes with X=NH₂ or NH₂—CH₂—CH₂—NH, X¹=NH and X²=N. Particular preference is given to 3-aminopropyltrimethoxysilane, N-(2-aminoethyl)-3-aminopropyltrimethoxysilane, bis[3-(trimethoxysilyl)propyl]amine, 3-aminopropyltriethoxysilane, N-(2-aminoethyl)-3-aminopropyltriethoxysilane and bis[3-(triethoxysilyl)propyl]amine and mixtures thereof with one another.

Suitable aminosilanes are especially aminosilanes selected from the group consisting of 3-aminopropyltrimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxymethylsilane, N-propylaminomethyldimethoxymethylsilane, N-butylaminomethyldimethoxymethylsilane; N-(2-aminoethyl)-3-aminopropyltrimethoxysilane, 3-[2-(2-aminoethylamino)ethylamino]propyltrimethoxysilane, bis(trimethoxysilylpropyl)amine, and analogs thereof having three ethoxy or three isopropoxy groups rather than the three methoxy groups on the silicon.

In one embodiment, the aminosilane of the formula (I) is an aminosilane of the formula (V)

where R⁵ is a linear or branched alkylene group having 1 to 6 carbon atoms, especially propylene, and the other substituents and indices are as defined in formula (I). Particular preference is given here to 3-aminopropyltrimethoxysilane.

In a preferred embodiment, the aminosilane of the formula (I) has secondary amino groups, especially aminosilanes of the formula (VI) or (VII) or (VIII).

where R⁵ is a linear or branched alkylene group having 1 to 6 carbon atoms, especially propylene, and the other substituents and indices are as defined in formula (I). N-(2-

Aminoethyl)-3-aminopropyltrimethoxysilane, 3-[2-(2-aminoethylamino)ethylamino]propyltrimethoxysilane and bis(trimethoxysilylpropyl)amine have been found to be particularly preferable.

It has been found to be particularly advantageous when two or more aminosilanes of the formula (I) are present in the composition, of which preferably at least one is an aminosilane of the formula (VI). A particularly preferred combination is an aminosilane of the formula (VI) and an aminosilane of the formula (VIII) in the composition.

All compositions of the invention are aqueous, i.e. the composition further comprises water.

The composition of the invention is especially a one-component aqueous composition comprising 90-98% by weight, based on the overall composition, of water. If it is a multicomponent composition, it preferably comprises 90-98% by weight, based on the overall composition, of water after all components have been mixed.

A particularly preferred first main embodiment of the composition of the invention comprises water, and:

0.3% to 1% A by weight of glycidoxypropyltrimethoxysilane, based on the total weight of the aqueous composition, 0.1% to 2% by weight of at least one wetting agent selected from polyethers, polyethersiloxanes, pyrrolidones and modified natural oils, 0.3% to 1% by weight of mercaptopropyltrimethoxysilane, based on the total weight of the aqueous composition, 0% to 0.3% by weight of at least one amino- or isocyanuratosilane, based on the total weight of the aqueous composition, and a sufficient amount of a water-soluble acid that the pH of the resulting composition is between 2.5 and 5.

A particularly preferred first main embodiment of the composition of the invention comprises water, and:

0.2% to 0.4% by weight of glycidoxypropyltrimethoxysilane, based on the total weight of the aqueous composition, 0.1% to 2.5% by weight of at least one wetting agent selected from polyethers and pyrrolidones, 0.3% to 0.6% by weight of tetraalkoxytitanate, especially 2-propanolatotris(3,6-diaza)hexanolatotitanium(IV), 0% to 1.5% by weight of at least one aminosilane, based on the total weight of the aqueous composition, and a sufficient amount of a water-soluble base that the pH of the resulting composition is between 9 and 11.5.

The one-component or multicomponent composition may comprise further optional constituents. Such additional constituents are, for example, anionic, cationic or amphoteric surfactants, adhesion promoter additives, catalysts, cosolvents, biocides, antisettling agents, stabilizers, inhibitors, pigments, dyes, anticorrosives, odorants, UV indicators, thixotropic agents, fillers, defoamers and further additives known to the person skilled in the art in the field of aqueous adhesion promoter compositions.

For example, ionic or amphoteric surfactants are possible additional constituents of the one- or two-component aqueous adhesion promoter composition. Such surfactants used may be natural or synthetic substances that lower the surface tension of the water or other liquids in solutions. Surfactants used, also called wetting agents, may be anionic, cationic or ampholytic surfactants or mixtures thereof.

Examples of anionic surfactants are surfactants having carboxylate, sulfate, phosphate or sulfonate groups, for example amino acid derivatives, fatty alcohol ether sulfates, fatty alcohol sulfates, soaps, alkylphenol ethoxylates, fatty alcohol ethoxylates, but also alkanesulfonates, olefinsulfonates or alkylphosphates.

Examples of cationic surfactants are quaternary ammonium or phosphonium compounds, for example tetraalkylammonium salts, N,N-dialkylimidazoline compounds, dimethyldistearylammonium compounds, or N-alkylpyridine compounds, especially ammonium chlorides. The ampholytic or amphoteric surfactants include amphoteric electrolytes, called ampholytes, for example aminocarboxylic acids, and betaines.

A further optional constituent used with preference is a water-soluble adhesion promoter additive, preferably a water-soluble amine-containing adhesion promoter additive. The use of water-soluble adhesion promoter additives generally improves bonding performance. Water-soluble adhesion promoter additives are commercially available.

Examples of suitable water-soluble adhesion promoter additives are reactive organofunctional siloxane oligomers. Examples are condensed aminosiloxanes and/or phenylsiloxanes. The degree of condensation of the siloxanes may be different. The siloxanes may be dimers, trimers or oligomers composed of four or more monomeric silanes or mixtures thereof. Such siloxanes, especially aminosiloxanes, are also commercially available, for example as Dynasylan® HYDROSIL 2627, Dynasylan® HYDROSIL 2776 or Dynasylan® HYDROSIL 2929 from Degussa AG, Germany.

Cosolvents are understood to mean water-miscible solvents such as alcohols or ethers or ketones. However, it is preferable that such solvents are used only in a small amount, i.e. typically less than 10% by weight based on the water. More preferably, the composition—apart from traces of alcohols that result from the hydrolysis of the alkoxysilanes used in the aqueous composition—is free of such cosolvents. If a greater content of solvent is used, the VOC problem is increased in turn, the avoidance of which is of course one of the main reasons for the use of aqueous compositions.

The composition may be a one-component or two-component aqueous adhesion promoter composition, more preferably a one-component aqueous adhesion promoter composition.

In the preferred one-component aqueous adhesion promoter composition, the above-described silanes, wetting agents and water are present in the sole component. The two-component aqueous adhesion promoter composition consists of a silane component A, also called silane premix, comprising the above-described silanes and optionally wetting agents, and an aqueous component B, also called aqueous premix, comprising water. The one-component aqueous adhesion promoter composition is notable for excellent storage stability.

When water is added to the composition containing the silanes, the silanes can undergo hydrolysis and/or condensation with time, usually within a few minutes. The composition may then comprise, as well as the silanes present therein, also hydrolysis and/or condensation products of these silanes or, in the case of advanced conversion, possibly only hydrolysis and/or condensation products of the silanes present as described above.

The preferred one-component aqueous composition is preferably produced as follows. To an initial charge of water are preferably added, while stirring, additional constituents such as at least one wetting agent and, depending on the embodiment, further constituents. The addition is appropriately effected at room temperature; if appropriate, the stirring operation can also be effected at elevated temperature.

The additional constituents are preferably added successively and, prior to addition of the next constituent, stirring is preferably continued until the constituent has dissolved in water or been distributed homogeneously. The sequence of addition of the possible additional constituents is arbitrary.

The mixture is appropriately stirred for a certain time in order to obtain a homogeneous mixture.

The one- or two-component aqueous composition of the invention is especially suitable as adhesion promoter or primer, preferably as primer for adhesives and sealants. The use of such a primer improves the adhesive bond.

The adhesive used may in principle be any adhesive. Advantageous improvements in adhesion are found especially in the case of polyurethane adhesives, especially those containing polyurethane prepolymers having isocyanate groups. Such polyurethane adhesives are widely commercially available, for example Sikaflex® from Sika Schweiz AG. The aqueous composition of the invention is particularly suitable for 1K (one-component) polyurethane adhesives.

A suitable method for bonding or sealing two or more substrates is thus one in which the aqueous adhesion promoter composition of the invention is applied to at least one substrate as a pretreatment and flashed off. Subsequently, the substrates are bonded or sealed with an adhesive or sealant, preferably a 1K polyurethane adhesive.

The adhesion promoter compositions can be used in various ways. In a particularly preferred embodiment, they are a primer or an adhesion-promoting undercoat.

In a further aspect, the present invention relates to a method of bonding or of sealing. This method comprises the following steps:

i) applying an adhesion promoter composition as described above to a substrate S1 to be bonded or sealed ii) applying an adhesive or sealant to the composition present on the substrate S1 iii) contacting the adhesive or sealant with a second substrate S2;

or i') applying an adhesion promoter composition as described above to a substrate S1 to be bonded or sealed ii') applying an adhesive or sealant to the surface of a second substrate S2 iii') contacting the adhesive or sealant with the composition present on the substrate S1;

or i") applying an adhesion promoter composition as described above to a substrate S1 to be bonded or sealed ii") applying an adhesive or sealant between the surfaces of substrates S1 and S2.

The second substrate S2 here consists of the same material as the substrate S1 or a different one.

Typically, step iii), iii=) or ii") is followed by a step iv) of curing the adhesive or sealant.

The adhesive or sealant used may in principle be any adhesive or sealant. The selection is guided by factors including the open time and the mechanical demands on the bond formed. It has been found that this method is of especially good suitability for polyurethane adhesives or sealants, especially for polyurethane adhesives containing at least one polyurethane prepolymer having isocyanate groups. Such polyurethane adhesives cure under the influence of air humidity via a crosslinking reaction of isocyanate groups and are widely commercially available, especially under the Sikaflex® name from Sika Schweiz AG.

Prior to step ii), ii') or ii"), there may be at most a wiping-off step with a dry cloth. The ever-present application by means of a soaked cloth or a similar method is referred to as "wipe-on". Correspondingly, the combination of application and wiping-off is referred to as "wipe-on/off".

With the application of the adhesive or sealant, it is possible to wait until the adhesion promoter composition has flashed off. However, it has been found that, astonishingly, application of the adhesive or sealant is in most cases also possible directly to the still-moist adhesion promoter composition film, i.e. "wet-on-wet", without this having any notable disadvantages in the adhesion or mechanical properties of the cured sealant or adhesive.

The substrate S1 may be the same as or different than substrate S2. Suitable substrates S1 or S2 are, for example, inorganic substrates such as glass, glass ceramic, concrete, mortar, brick, tile, gypsum and natural rocks such as granite or marble; metals or alloys such as aluminum, steel, non-ferrous metals, precious metals such as silver, galvanized metals; organic substrates such as wood, plastics such as PVC, polycarbonates, PMMA, polyesters, epoxy resins; coated substrates such as powder-coated metals or alloys; and paints and lacquers. Especially preferred as substrates S1 or S2 are glass, glass ceramic, screenprint or silver print on glass or glass ceramic, aluminum and lacquers, especially in the form of automotive paint. The substrates can be pretreated if required prior to the application of the adhesive or sealant. Pretreatments of this kind especially include physical and/or chemical cleaning methods, for example sanding, sandblasting, brushing or the like, or treatment with detergents or solvents, or the application of an adhesion promoter, an adhesion promoter solution or a primer. Such a method of bonding or sealing results in an article. Since the method can be used widely, for example in industrial manufacture or in civil engineering or structural engineering, the nature of this article is also very varied.

More particularly, this article is a built structure, an industrial good or a mode of transport. More particularly, it is a building, or a part thereof. Or the article is especially a mode of transport, especially an automobile, bus, truck, rail vehicle, ship or aircraft.

The aqueous composition of the invention is particularly suitable as pretreatment for bonding of glass panes, especially in vehicle construction, or for direct glazing. Therefore, in a preferred embodiment, one substrate is glass or glass ceramic and the second substrate is a lacquer or a painted metal or a painted metal alloy.

The use of mercaptosilanes in the aqueous composition leads to a significant improvement in adhesion of 1K polyurethane adhesives on silver or on silver-based compositions or alloys. It has been found that the method described is of especially good suitability for bonding of glass panes with an integrated antenna or other electronic components. Such antenna contacts or other electrionic components are present on the pane and typically composed of silver or of silver-based compositions or alloys.

EXAMPLES

The invention is elucidated further by examples which follow, but these are not intended to limit the invention in any way. Unless stated otherwise, all figures are based on weight. More particularly, the numbers in the tables for the respective compositions mean percent by weight, based on the total weight of the respective example composition.

Raw Materials Used

TABLE 1

Raw materials used.

| | |
|---|---|
| Sil A1110 | 3-Aminopropyltrimethoxysilane Silquest ® A1110, Momentive Performance Materials |
| Sil A1120 | N-(2-Aminoethyl)-3-aminopropyltrimethoxysilane Silquest ® A1120, Momentive Performance Materials |
| Sil A1170 | Bis(trimethoxysilylpropyl)amine Silquest ® A1170, Momentive Performance Materials |
| Sil A187 | 3-Glycidoxypropyltrimethoxysilane Silquest ® A187, Momentive Performance Materials |

TABLE 1-continued

Raw materials used.

| | |
|---|---|
| Sil A189 | 3-Mercaptopropyltrimethoxysilane Silquest ® A189, Momentive Performance Materials |
| A-Link 597 | Tris(3-(trimethoxysilyl)propyl) isocyanurate Silquest ® A-Link ® 597, Momentive Performance Materials |
| KR 44 | Titanate; 2-propanolato, tris(3,6-diaza)hexanolato titanium(IV), Ken-React ® KR 44, Kenrich Petrochemicals |
| Hydropalat | Wetting agent; modified natural oil, free of silicone, Hydropalat ® 3037, Cognis, Germany |
| Byk 349 | Wetting agent; polyether-modified siloxane, BYK-349, BYK Chemie GmbH, Germany |
| CHP | Wetting agent; N-cyclohexyl-2-pyrrolidone |
| TOU | Wetting agent; 2,5,7,10-tetraoxaundecane |
| Acetic acid | Acetic acid, 99% |
| TMG | Tetramethylguanidine |

Production of the Compositions

All compositions C1 to C10 according to tables 2 and 3 were produced in 100 mL laboratory glass bottles.

Compositions C1 to C4 and C9 to C10 were produced as aqueous premix and silane premix.

The aqueous premix was produced in each case by adding the wetting agent to an initial charge of water, adding acid and homogenizing by mixing. The respective silane premix was produced in a separate bottle by initially introducing the CHP wetting agent and adding the further constituents, if used, in the following sequence while stirring: Sil A189, Sil A187, Sil A1170, A-Link 597, Sil A1120, Byk 349. Subsequently, the mixture was homogenized in a laboratory shaker.

The silane premix was then added to the aqueous premix while stirring within about 10 seconds. This was followed by stirring for a further two minutes and homogenizing in a laboratory shaker.

The constituents of compositions C5 to C8 were added gradually to a single vessel while stirring in the sequence specified in the table. This was followed by stirring for a further two minutes and homogenizing in a laboratory shaker.

TABLE 2

Compositions C1-C4 and C9-C10; "n/m" means that the value was not measured.

| | Ingredients (% by wt.) | C1 (Ref.) | C2 | C3 | C4 (Ref.) | C9 (Ref.) | C10 (Ref.) |
|---|---|---|---|---|---|---|---|
| Aqueous premix | Deionized water | 92.5 | 95.05 | 97.4 | 93.8 | 97.05 | 97.5 |
| | Hydropalat | 0.5 | 0.5 | 0.5 | 0.5 | 0.5 | 0.5 |
| | Acetic acid | 4.4 | 2.0 | 0.2 | 4.4 | 0.2 | 0.4 |
| Silane premix | CHP | 0.9 | 0.9 | 0.9 | 0.9 | 2 | 0.9 |
| | Byk 349 | 0.1 | 0.1 | 0.1 | 0.1 | 0.1 | 0.1 |
| | Sil A189 | 0.3 | 0.65 | 0.3 | 0.3 | — | — |
| | Sil A187 | — | 0.65 | 0.3 | — | — | 0.3 |
| | Sil A1170 | 0.65 | 0.15 | — | — | — | — |
| | A-Link 597 | — | — | 0.3 | — | — | 0.3 |
| | Sil A1120 | 0.65 | — | — | — | 0.15 | — |
| | Total | 100 | 100 | 100 | 100 | 100 | 100 |
| | pH (of the combined premix) | 3.7 | 2.9 | 4.4 | n/m | n/m | 4.0 |

TABLE 3

Compositions C5 to C8.

| Ingredients (% by wt.) | C5 | C6 | C7 | C8 (Ref.) |
|---|---|---|---|---|
| Deionized water | 96.95 | 95.95 | 95.95 | 99.35 |
| TOU | 2 | 2 | 2 | — |
| TMG | 0.4 | 0.4 | 0.4 | — |
| KR44 | 0.4 | 0.4 | 0.4 | 0.4 |
| Sil A187 | 0.25 | 0.25 | 0.25 | 0.25 |
| Sil A1110 | — | 1 | — | — |
| Sil A1120 | — | — | 1 | — |
| Total | 100 | 100 | 100 | 100 |
| pH | 12.3 | 11.4 | 11.3 | 10.2 |

Testing

The aqueous compositions C1 to C8 formed were tested for the heat stability of the adhesive bonds on various substrates as adhesion promoter in combination with various adhesives. To this end, adhesive bonds that had been stored at room temperature (RT) for 7 days (d) or 90° C. for 7 to 34 days were tested by the method specified below.

The adhesive used was a Sikaflex®-250, which is a commercially available one-component moisture-curing polyurethane adhesive which contains polyurethane prepolymers having isocyanate groups and is commercially available from Sika Schweiz AG.

The substrates used were: "Float glass (Sn)": float glass in which the tin side was used for adhesion testing, Rocholl, Germany; "Float glass (air)": float glass in which the air side was used for adhesion testing, Rocholl, Germany; "VSG": VSG ceramic, Ferro 14279, Rocholl, Germany; "ESG": ESG ceramic, Ferro 14251, Rocholl, Germany; "Frit 3402": ESG ceramic, Ferro AD 3402, Rocholl, Germany.

All substrate faces were cleaned immediately prior to the application of the adhesion promoter compositions by wiping-off by means of a cellulose cloth (Tela®) that had been soaked with an isopropanol/water mixture (2:1) and flashed off for at least 2 minutes prior to the application of the adhesion promoter composition.

The aqueous compositions were applied to the particular substrate by means of a cellulose cloth soaked therewith (Tela®, Tela-Kimberly Switzerland GmbH) and flashed off for 10 minutes ("wipe-on"). For comparative purposes, identical applications were undertaken, except with wiping-off 3 minutes after application with a dry cellulose cloth (Tela®, Tela-Kimberly Switzerland GmbH) ("wipe-on/off"). A triangular bead of the adhesive was applied by means of expression cartridge and nozzle at 23±2° C. and 50% rel. air humidity. The adhesive itself was equilibrated in a closed cartridge at 60° C. for 2 h prior to application.

The cured bond with the adhesive was tested after a curing time of 7 days under controlled climatic conditions (23° C., 50% rel. air humidity) (RT), and after subsequent heat storage (90° C.) in an oven for 7 to 34 days.

The adhesion of the adhesive was tested by means of the 'bead adhesion test'. This involves cutting into the bead at its end just above the bond surface. The cut end of the bead is held with round-nose pliers and pulled away from the substrate. This is done by cautiously rolling up the bead onto the tip of the pliers, and making a cut at right angles to the bead pulling direction down to the bare substrate. The bead pulling speed should be chosen such that a cut has to be made about every 3 seconds. The test distance must correspond to at least 8 cm. What is assessed is the adhesive remaining on the substrate after the bead has been pulled away (cohesion fracture). The adhesion properties are assessed by visual determination of the cohesive fraction of the bonding area.

The higher the proportion of cohesive fracture, the better the assessment of the adhesive bond. Test results with cohesion fractures of less than 70% are typically considered to be inadequate. The results are summarized in tables 4 to 9.

It is clearly apparent from the results that the aqueous adhesion promoter compositions of the invention achieve good results even after prolonged heat storage, while the noninventive adhesion promoters used as a comparison show a distinct reduction in performance in the case of prolonged heat storage.

TABLE 4

Bonding results on float glass (air).

| Float glass (air) | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 80 | 15 | 15 | 5 |
| | on/off | 100 | 50 | 65 | 25 | 15 | 5 |
| C2 | on | 100 | 100 | 100 | 100 | 100 | 100 |
| | on/off | 100 | 100 | 100 | 100 | 100 | 98 |
| C3 | on | 100 | 100 | 100 | 100 | 100 | 98 |
| | on/off | 100 | 100 | 100 | 100 | 100 | 95 |
| C4 (Ref.) | on/off | 95 | 80 | 40 | 5 | 0 | 0 |
| C5 | on | 95 | 100 | 100 | 100 | 100 | 100 |
| | on/off | 100 | 100 | 100 | 100 | 100 | 100 |
| C6 | on | 100 | 100 | 100 | 100 | 100 | 100 |
| | on/off | 100 | 90 | 100 | 100 | 100 | 95 |
| C7 | on | 95 | 100 | 100 | 100 | 100 | 100 |
| | on/off | 100 | 100 | 100 | 100 | 100 | 100 |
| C9 (Ref.) | on/off | 100 | 100 | 40 | 60 | 20 | 0 |
| C10 (Ref.) | on/off | 100 | 100 | 30 | 5 | n/m | n/m |

TABLE 5

Bonding results on float glass (Sn).

| Float glass (Sn) | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 85 | 30 | 35 | 5 |
| | on/off | 100 | 60 | 20 | 5 | 5 | 0 |
| C2 | on | 100 | 100 | 100 | 100 | 100 | 100 |
| | on/off | 100 | 100 | 100 | 98 | 75 | 30 |
| C3 | on | 100 | 100 | 100 | 100 | 100 | 100 |
| | on/off | 100 | 98 | 100 | 98 | 98 | 95 |
| C4 (Ref.) | on/off | 100 | 95 | 40 | 10 | 5 | 0 |
| C5 | on | 75 | 100 | 100 | 100 | 100 | 100 |
| | on/off | 80 | 100 | 100 | 100 | 100 | 98 |
| C6 | on | 98 | 95 | 95 | 100 | 100 | 100 |
| | on/off | 98 | 95 | 100 | 100 | 100 | 100 |
| C7 | on | 95 | 100 | 100 | 95 | 100 | 98 |
| | on/off | 100 | 100 | 100 | 100 | 100 | 100 |
| C8 (Ref.) | on | 20 | 100 | 100 | 100 | 100 | 100 |
| | on/off | 10 | 100 | 100 | 100 | 100 | 100 |

TABLE 6

Bonding results on VSG.

| VSG | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 95 | 60 | 60 | 80 |
| | on/off | 98 | 100 | 95 | 5 | 5 | 0 |
| C2 | on | 100 | 100 | 100 | 100 | 100 | 100 |
| | on/off | 85 | 100 | 100 | 90 | 90 | 50 |
| C3 | on | 100 | 100 | 100 | 100 | 100 | 100 |
| | on/off | 70 | 100 | 95 | 95 | 85 | 70 |
| C4 (Ref.) | on/off | 10 | n/m | n/m | n/m | n/m | n/m |
| C5 | on | 50 | 100 | 100 | 95 | 98 | 95 |
| | on/off | 95 | 100 | 100 | 95 | 98 | 40 |
| C6 | on | 100 | 100 | 100 | 100 | 100 | 65 |
| | on/off | 100 | 100 | 100 | 100 | 100 | 65 |
| C7 | on | 90 | 100 | 100 | 95 | 85 | 50 |
| | on/off | 100 | 100 | 100 | 100 | 75 | 40 |
| C8 (Ref.) | on | 20 | n/m | n/m | n/m | n/m | n/m |
| | on/off | 30 | n/m | n/m | n/m | n/m | n/m |
| C9 (Ref.) | on/off | 5 | n/m | n/m | n/m | n/m | n/m |

TABLE 7

Bonding results on ESG.

| ESG | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 100 | 45 | 85 | 5 |
| | on/off | 100 | 100 | 90 | 30 | 10 | 5 |
| C2 | on | 100 | 100 | 100 | 100 | 100 | 100 |
| | on/off | 90 | 100 | 100 | 100 | 100 | 100 |
| C3 | on | 100 | 100 | 100 | 100 | 100 | 100 |
| | on/off | 80 | 100 | 100 | 100 | 100 | 100 |
| C4 (Ref.) | on/off | 0 | n/m | n/m | n/m | n/m | n/m |
| C5 | on | 80 | 100 | 100 | 100 | 100 | 100 |
| | on/off | 98 | 100 | 100 | 100 | 100 | 100 |
| C6 | on | 100 | 100 | 100 | 100 | 90 | 95 |
| | on/off | 100 | 100 | 100 | 100 | 95 | 98 |
| C7 | on | 100 | 100 | 100 | 100 | 100 | 100 |
| | on/off | 100 | 100 | 100 | 100 | 100 | 100 |

TABLE 8

Bonding results on Frit 3402.

| Frit 3402 | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 100 | 100 | 100 | 100 |
| | on/off | 100 | 100 | 100 | 100 | 95 | 80 |
| C2 | on | 100 | 100 | 100 | 100 | 100 | 100 |
| | on/off | 98 | 100 | 100 | 100 | 100 | 98 |
| C3 | on | 100 | 100 | 100 | 100 | 100 | 100 |
| | on/off | 85 | 100 | 100 | 100 | 98 | 90 |
| C4 (Ref.) | on/off | 25 | n/m | n/m | n/m | n/m | n/m |
| C5 | on | 100 | 100 | 100 | 100 | 100 | 100 |
| | on/off | 98 | 100 | 100 | 100 | 100 | 95 |
| C6 | on | 100 | 100 | 100 | 100 | 100 | 100 |
| | on/off | 100 | 100 | 100 | 100 | 90 | 80 |
| C7 | on | 100 | 100 | 100 | 100 | 100 | 95 |
| | on/off | 100 | 100 | 100 | 100 | 100 | 95 |

TABLE 9

Bonding results on all substrates (average).

| Average | | RT (d) | 90° C. (d) | | | |
|---|---|---|---|---|---|---|
| Pretreatment | wipe | 7 | 7 | 14 | 21 | 28 | 34 |
| C1 (Ref.) | on | 100 | 100 | 92 | 50 | 59 | 39 |
| | on/off | 99.6 | 82 | 74 | 33 | 26 | 18 |
| C2 | on | 100 | 100 | 100 | 100 | 100 | 100 |
| | on/off | 94.6 | 100 | 100 | 97.6 | 93 | 75.2 |

TABLE 9-continued

Bonding results on all substrates (average).

| | Average | RT (d) | | 90° C. (d) | | | |
|---|---|---|---|---|---|---|---|
| Pretreatment | wipe | 7 | 7 | 14 | 21 | 28 | 34 |
| C3 | on | 100 | 100 | 100 | 100 | 100 | 99.6 |
| | on/off | 87 | 99.6 | 99 | 98.6 | 96.2 | 89 |
| C5 | on | 80 | 100 | 100 | 99 | 99.6 | 99 |
| | on/off | 94.2 | 100 | 100 | 99 | 99.6 | 86.6 |
| C6 | on | 99.6 | 99 | 99 | 100 | 98 | 92 |
| | on/off | 99.6 | 97 | 100 | 100 | 97 | 87.6 |
| C7 | on | 97 | 100 | 100 | 98 | 97 | 81.6 |
| | on/off | 100 | 100 | 100 | 100 | 82 | 77 |

The invention claimed is:

1. An aqueous composition comprising
   a) at least one epoxysilane having at least one epoxy group and at least one Si-bonded hydrolyzable group,
   b) at least one nonionic wetting agent, and either
   c1) 0.2% to 2% by weight, based on the total weight of the aqueous composition, of at least one mercaptosilane having at least one mercapto group and at least one Si-bonded hydrolyzable group, and a sufficient amount of a water-soluble acid that the pH of the resulting composition is between 1 and 6, with the proviso that the epoxysilane is present in an amount of 0.2% to 1% by weight, based on the total weight of the aqueous composition;

or c2) 0.1% to 1% by weight of a water-soluble organotitanate, based on the total weight of the aqueous composition, and a sufficient amount of the a water-soluble base that the pH of the resulting composition is between 8 and 14, with the proviso that the epoxysilane is present in an amount of 0.2% to 0.5% by weight, based on the total weight of the aqueous composition; wherein the composition is a one-component aqueous composition comprising 95-98% by weight, based on the overall composition, of water.

2. The composition as claimed in claim 1, wherein the at least one wetting agent is selected from emulsifiers and surfactants from the group of polyethers, polyethersiloxanes, pyrrolidones and modified natural oils.

3. The composition as claimed in claim 1, wherein the epoxysilane comprises glycidoxypropyltrimethoxysilane and/or glycidoxypropyltriethoxysilane.

4. The composition as claimed in claim 1, wherein the composition comprises further organosilanes or oligomers of these organosilanes that have at least one Si-bonded hydrolyzable group and have at least one further functional group selected from primary amino groups, secondary amino groups, hydroxyl groups and isocyanurate groups.

5. The composition as claimed in claim 1, wherein the composition comprises constituent c1) and the mercaptosilane comprises mercaptopropyltrimethoxysilane and/or mercaptopropyltriethoxysilane.

6. The composition as claimed in claim 1, wherein the composition comprises constituent c1) and the acid comprises a carboxylic acid.

7. The composition as claimed in claim 1, wherein the composition comprises constituent c2) and the organotitanate comprises a tetraalkoxytitanate.

8. The composition as claimed in claim 1, wherein the composition comprises constituent c2) and the base comprises a compound having at least one tertiary amine group.

9. The composition as claimed in claim 1, wherein the composition comprises 95.05-98% by weight of water and:
   0.3% to 1% by weight of glycidoxypropyltrimethoxysilane, based on the total weight of the aqueous composition,
   0.1% to 2% by weight of at least one wetting agent selected from polyethers, polyethersiloxanes, pyrrolidones and modified natural oils,
   0.3% to 1% by weight of mercaptopropyltrimethoxysilane, based on the total weight of the aqueous composition, and
   0% to 0.3% by weight of at least one amino- or isocyanuratosilane, based on the total weight of the aqueous composition, and a sufficient amount of a water-soluble acid that the pH of the resulting composition is between 2.5 and 5.

10. The composition as claimed in claim 1, wherein the composition comprises 95.05-98% by weight of water and:
    0.2% to 0.4% by weight of glycidoxypropyltrimethoxysilane, based on the total weight of the aqueous composition,
    0.1% to 2.5% by weight of at least one wetting agent selected from polyethers and pyrrolidones,
    0.3% to 0.6% by weight of tetraalkoxytitanate,
    0% to 1.5% by weight of at least one aminosilane, based on the total weight of the aqueous composition, and a sufficient amount of a water-soluble base that the pH of the resulting composition is between 9 and 11.5.

11. A method comprising applying the aqueous composition as claimed in claim 1 to a substrate as an adhesion promoter or primer.

12. The method as claimed in claim 11, wherein the substrate is a glass or glass ceramic substrate.

13. The method as claimed in claim 11, wherein the application of the aqueous composition is for direct glazing in automobile construction.

14. The method as claimed in claim 11, wherein the aqueous composition is applied together with a polyurethane adhesive.

* * * * *